US012057631B2

(12) United States Patent
Takahashi et al.

(10) Patent No.: US 12,057,631 B2
(45) Date of Patent: Aug. 6, 2024

(54) ANTENNA UNIT AND WINDOW GLASS

(71) Applicant: AGC Inc., Tokyo (JP)

(72) Inventors: Yukio Takahashi, Tokyo (JP); Masaki Horie, Tokyo (JP); Ryuta Sonoda, Tokyo (JP)

(73) Assignee: AGC Inc., Tokyo (JP)

( * ) Notice: Subject to any disclaimer, the term of this patent is extended or adjusted under 35 U.S.C. 154(b) by 121 days.

(21) Appl. No.: 17/903,188

(22) Filed: Sep. 6, 2022

(65) Prior Publication Data

US 2022/0416414 A1 Dec. 29, 2022

Related U.S. Application Data

(63) Continuation of application No. PCT/JP2021/019428, filed on May 21, 2021.

(30) Foreign Application Priority Data

May 29, 2020 (JP) ................................ 2020-094781

(51) Int. Cl.
*H01Q 1/52* (2006.01)
*H01Q 1/12* (2006.01)
*H01Q 21/06* (2006.01)

(52) U.S. Cl.
CPC ........... *H01Q 1/526* (2013.01); *H01Q 1/1271* (2013.01); *H01Q 21/065* (2013.01)

(58) Field of Classification Search
USPC .......................................................... 343/720
See application file for complete search history.

(56) References Cited

U.S. PATENT DOCUMENTS 11,177,566 B2 * 11/2021 Wu .......................... H01Q 1/38

FOREIGN PATENT DOCUMENTS

| | | | | | |
|---|---|---|---|---|---|
| JP | 06-196915 | A | | 7/1994 | |
| JP | 10256936 | A | * | 9/1998 | H01Q 1/088 |
| WO | WO-2018122926 | A1 | * | 7/2018 | G01S 13/42 |
| WO | WO 2019/107514 | A1 | | 6/2019 | |
| WO | WO-2020095818 | A1 | * | 5/2020 | H01Q 1/088 |

OTHER PUBLICATIONS

International Search Report issued Aug. 10, 2021 in PCT/JP2021/019428 filed on May 21, 2021, 2 pages.

* cited by examiner

*Primary Examiner* — Hoang V Nguyen
*Assistant Examiner* — Brandon Sean Woods
(74) *Attorney, Agent, or Firm* — Oblon, McClelland, Maier & Neustadt, L.L.P.

(57) ABSTRACT

To suppress downward radiation of electromagnetic waves from an antenna unit. An antenna unit to be used by being installed so as to face a window glass for a building, the antenna unit comprising a plurality of array antennas, wherein each of the plurality of array antennas has a plurality of radiating elements and at least one conductor situated on an interior side relative to the plurality of radiating elements, and where the effective wavelength of the plurality of array antennas at the operation frequency is A, and an integer of 0 or more is n, the distance from the center of the upper radiating element among the plurality of radiating elements to the upper edge of the conductor in the up-and-down direction is (0.5+n)A±0.22A, as seen in a plan view of the antenna unit.

12 Claims, 11 Drawing Sheets

ANTENNA UNIT AND WINDOW GLASS

TECHNICAL FIELD

The present disclosure relates to an antenna unit and a window glass.

BACKGROUND ART

Conventionally, there has been known a technique for improving the electromagnetic wave transmission performance by using, as a building finishing material, an electromagnetic wave transparent body having a three-layer structure covering an antenna (for example, see Patent Document 1).

PRIOR ART DOCUMENTS

Patent Documents

Patent Document 1: JP-A-H06-196915

DISCLOSURE OF INVENTION

Technical Problem

When an antenna unit is installed so as to face a window glass, there may be a person under the antenna unit. In such a case, it is desired to suppress radiation of electromagnetic waves from the antenna unit toward the person under the antenna unit.

The present disclosure provides an antenna unit capable of suppressing downward radiation of electromagnetic waves from the antenna unit, and a window glass.

Solution to Problem

The present disclosure provides an antenna unit to be used by being installed so as to face a window glass for a building, the antenna unit comprising a plurality of array antennas,

- wherein each of the plurality of array antennas has a plurality of radiating elements and at least one conductor situated on an interior side or on an exterior side relative to the plurality of radiating elements,
- and where the effective wavelength of the plurality of array antennas at the operation frequency is λ, and an integer of 0 or more is n, the distance from the center of the upper radiating element among the plurality of radiating elements to the upper edge of the conductor in the up-and-down direction is $(0.5+n)\lambda\pm0.22\lambda$, as seen in a plan view of the antenna unit. The present disclosure further provides a window glass comprising the antenna unit.

Advantageous Effects of Invention

According to the present disclosure, it is possible to suppress downward radiation of electromagnetic waves from an antenna unit.

DESCRIPTION OF EMBODIMENTS

Figure 1:
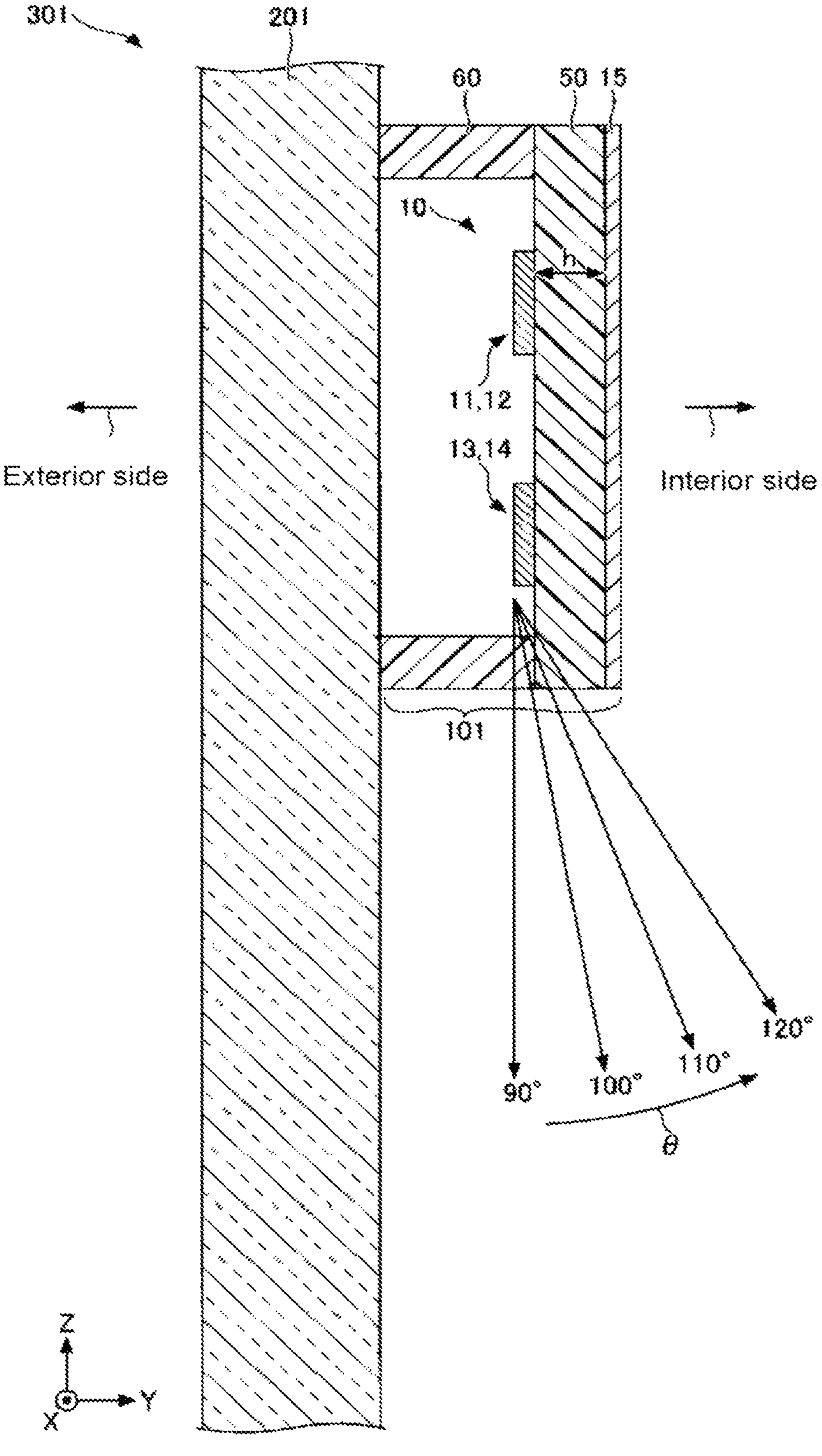
FIG. 1 is a cross sectional view schematically illustrating an example of a laminated structure of an antenna unit-attached window glass according to a first embodiment.

Hereinafter, the embodiment is described with reference to the drawings. For the ease of understanding, the scales of components illustrated in the drawings may differ from the actual scales. In this specification, three-dimensional Cartesian coordinate system constituted by three axial-directions (an X axis direction, a Y axis direction and a Z axis direction) is used, in which a width direction of a glass plate is defined as an X axis direction, a thickness direction of the glass plate is defined as a Y axis direction, and a height direction of the glass plate is defined as a Z axis direction. A direction extending from the lower side to the upper side of the glass plate is defined as +Z axis direction, and a direction opposite thereto is defined as a −Z axis direction. In the following explanation, the +Z axis direction may be referred to as upward, and the −Z axis direction may be referred to as downward.

The X-axis direction, the Y-axis direction, and the Z-axis direction represent a direction parallel to the X axis, a direction parallel to the Y axis, and a direction parallel to the Z axis, respectively. The X-axis direction, the Y-axis direction, and the Z-axis direction are orthogonal to one another. An XY plane is a virtual plane parallel to the X axis direction and the Y axis direction. A YZ plane is a virtual plane parallel to the Y axis direction and the Z axis direction. A ZX plane is a virtual plane parallel to the Z axis direction and the X axis direction.

FIG. 1 is a cross sectional view schematically illustrating an example of a laminated structure of an antenna unit-attached window glass according to the first embodiment. An antenna unit-attached window glass 301 has an antenna unit 101 and a window glass 201. The antenna unit 101 is used as being installed to face an interior side surface of the window glass 201 for a building.

For example, the X axis direction and the Y axis direction are substantially in parallel with the direction in parallel with the horizontal plane (horizontal direction), and the Z axis direction is substantially in parallel with the vertical direction perpendicular to the horizontal plane.

The window glass 201 is a glass plate used for window of a building or the like. For example, the window glass 201 is formed in a rectangular shape as seen in a plan view in the Y axis direction, and has a first glass surface and a second glass surface. The thickness of the window glass 201 is set according to the required specifications of a building or the like. In the present embodiment, the first glass surface of the window glass 201 is an exterior side surface, and the second glass surface is an interior side surface. In the present embodiment, the first glass surface and the second glass surface may be collectively simply referred to as a principal surface. In the present embodiment, the rectangular shape includes not only a rectangle and a square but also shapes obtained by rounding the corners of a rectangle and a square. The shape of the window glass 201 as seen in a plan view is not limited to the rectangular shape, but may be other shapes such as a circle.

The window glass 201 is not limited to a single plate, and may be laminated glass, insulating glass, or Low-e glass. The Low-e glass may also be referred to as low emissivity glass, and may be obtained by coating an interior side surface of a window glass with a coating layer (a transparent conductive film) having a heat ray reflection function. In this case, in order to suppress a decrease in the electromagnetic wave transmission performance, an opening portion may be provided in the coating layer. The opening portion is preferably provided at a position facing at least a portion of a plurality of radiating elements described later. The opening portion may have a patterning. The patterning is, for example, leaving the coating layer in a lattice shape. A portion of the opening portion may have a patterning.

Examples of materials of the window glass 201 include soda-lime-silica glass, borosilicate glass, aluminosilicate glass and alkali-free glass.

The thickness of the window glass 201 is preferably 1.0 to 20 mm. When the thickness of the window glass 201 is 1.0 mm or more, a sufficient strength for attaching an antenna unit can be provided. Further, when the thickness of the window glass 201 is 20 mm or less, the electromagnetic wave transmission performance is high. The thickness of the window glass 201 is more preferably 3.0 to 15 mm, further preferably 9.0 to 13 mm.

The antenna unit 101 is a device used by being attached to the interior side of the window glass 201 for a building, and transmits and receives electromagnetic waves through the window glass 201. For example, the antenna unit 101 is formed to be able to transmit and receive electromagnetic waves in compliance with wireless communication standards such as 5th generation mobile communication systems (commonly referred to as 5G), Bluetooth (registered trademark), and wireless LAN (Local Area Network) standards such as IEEE 802.11ac. The antenna unit 101 may be configured to be able to transmit and receive electromagnetic waves in compliance with standards other than the above, or may be configured to be able to transmit and receive electromagnetic waves in multiple different frequencies. The antenna unit 101 may be used as, for example, a wireless base station used so as to face the window glass 201.

Figure 2:
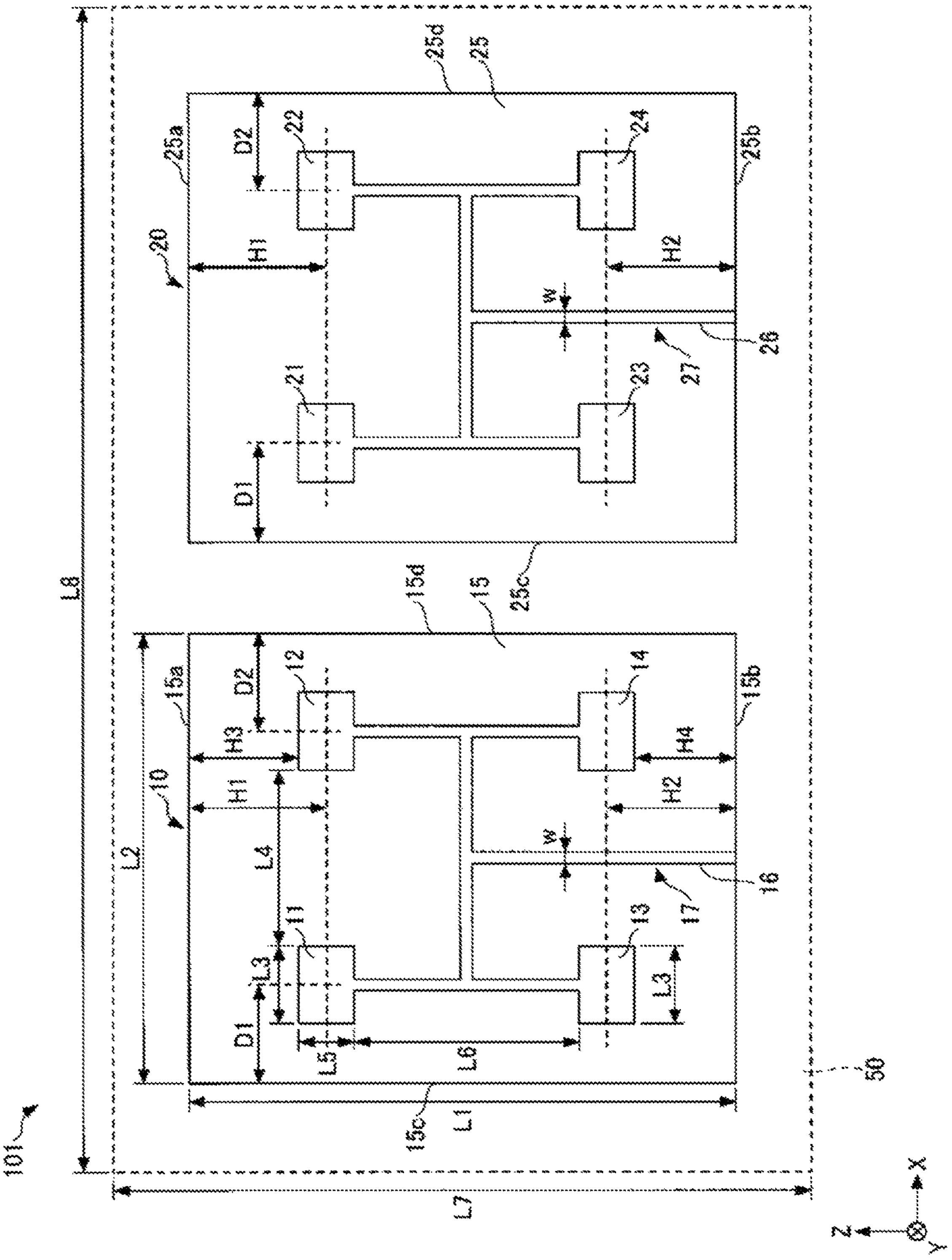
FIG. 2 is a view illustrating an example of a structure of an antenna unit according to a first embodiment as seen in a plan view.

FIG. 2 is a view illustrating an example of a structure of an antenna unit according to the first embodiment, as seen in a plan view in the Y axis direction. The antenna unit 101 shown in FIG. 2 has a plurality of (two in this example) array antennas 10, 20. The first array antenna 10 and the second array antenna 20 are planar antennas aligned side by side in the X axis direction as seen in a plan view in the Y axis direction.

The first array antenna 10 has a plurality of (four in this example) radiating elements 11, 12, 13 and 14 fed via a feeding line 16, and at least one conductor 15 situated on an interior side (the positive side in the Y axis direction in this example) relative to the plurality of radiating elements 11 to 14. The second array antenna 20 has a plurality of (four in this example) radiating elements 21, 22, 23 and 24 fed via a feeding line 26, and at least one conductor 25 situated on an interior side (the positive side in the Y axis direction in this example) relative to the plurality of radiating elements 21 to 24.

In FIG. 2, for convenience, the substrate 50 is represented by a dotted line, but the substrate 50 is situated between the radiating elements 11 to 14 and the conductor 15 (see FIG. 1). FIG. 1 illustrates the cross-sectional structure of the first array antenna 10 (illustration of the feeding line 16 is omitted), and the second array antenna 20 has substantially the same cross-sectional structure.

In FIG. 2, the first array antenna 10 is a microstrip array antenna having the substrate 50 between the radiating elements 11 to 14 and the conductor 15. The second array antenna 20 is a microstrip array antenna having the substrate 50 between the radiating elements 21 to 24 and the conductor 25.

The radiating elements 11 to 14 are fed by a transmission line with the conductor 15 being the ground reference, and the radiating elements 21 to 24 are fed by a transmission line with the conductor 25 being the ground reference.

For example, the first array antenna 10 has a microstrip line 17 which feeds the plurality of radiating elements 11 to 14, and the second array antenna 20 has a microstrip line 27 which feeds the plurality of radiating elements 21 to 24. In such a case, the feeding lines 16 and 26 are strip conductors formed on the surface on the window glass 201 side of the substrate 50. The microstrip line 17 is a transmission line having the substrate 50 sandwiched between the feeding line 16 and the conductor 15, and the microstrip line 27 is a transmission line having the substrate 50 sandwiched between the feeding line 26 and the conductor 25.

The first array antenna 10 and the second array antenna 20 may share one substrate 50, whereby the structure of the antenna unit 101 may be simplified. However, the substrate 50 may be multiple members for the first array antenna 10 and for the second array antenna 20.

The shape of the conductors 15 and 25 is not limited to a quadrangular shape as shown in FIG. 2, and may be a polygonal shape other than a quadrangular shape, a circular shape or an elliptic shape. FIG. 2 illustrates a case where the conductors 15 and 25 are rectangular, and the conductor 15 has an outer edge surrounded by an upper edge 15*a*, a lower edge 15*b*, a left edge 15*c* and a right edge 15*d*, and the conductor 25 has an outer edge surrounded by an upper edge 25*a*, a lower edge 25*b*, a left edge 25*c* and a right edge 25*d*. At least a portion of the outer edge is not limited to a straight line and may be curved. The corners of the conductors 15 and 25 may be rounded.

Where the effective wavelength of the first array antenna 10 at the operation frequency is λ, and an integer of 0 or more is n; and where the distance from the center of the upper radiating elements 11, 12 among the plurality of radiating elements 11 to 14 to the upper edge 15*a* of the conductor 15 in the up-and-down direction, as seen in a plan view in the Y axis direction of the antenna unit 101, is H1, when the distance H1 of the first array antenna 10 in the antenna unit 101 provided so as to face the window glass 201 is (0.5+n)λ±0.22λ, the gain below the first array antenna 10 decreases. As a result, downward radiation of electromagnetic waves from the antenna unit 101 can be suppressed, and radiation of electromagnetic waves from the antenna unit 101 to a person under the antenna unit 101 can be suppressed. In order that the gain below the first array antenna 10 decreases, the distance H1 is preferably (0.5+n)λ±0.17λ, more preferably (0.5+n)λ±0.12λ.

Likewise, where the effective wavelength of the second array antenna 20 at the operation frequency is λ, and an integer of 0 or more is n; and where the distance from the center of the upper radiating elements 21, 22 among the plurality of radiating elements 21 to 24 to the upper edge 25*a* of the conductor 25 in the up-and-down direction, as seen in a plan view in the Y axis direction of the antenna unit 101, is H1, by setting the distance H1 of the second array antenna 20 in the same manner as the distance H1 of the first array antenna 10, the gain below the second array antenna 20 decreases, and the downward radiation of electromagnetic waves from the antenna unit 101 can be suppressed. As a result, radiation of electromagnetic waves from the antenna unit 101 to a person under the antenna unit 101 can be suppressed.

The angle θ shown in FIG. 1 represents an angle relative to the horizontal direction) (0°), and the downward angle in the vertical direction is taken as 90°. When the distance H1 is set to be within the above range, in the region below the antenna unit 101, the gain in a specific direction on the interior side relative to the 90° direction decreases than the gain in the direction directly below the antenna unit 101 (90° direction). It is considered that a person is on the interior side slightly apart from the window glass 201 in a specific direction (for example in a direction of 100° or more and 110° or less) relative to the 90° direction in many cases. Accordingly, by a decrease of the gain in a specific direction on the interior side relative to the 90° direction, radiation of electromagnetic waves from the antenna unit 101 to a person under the antenna unit 101 can be suppressed.

The effective wavelength A of the array antenna at the operation frequency (the resonance frequency at the fundamental mode) satisfies the relation A:

$$\lambda=(1/\sqrt{\varepsilon_e})\lambda_0$$

wherein $\lambda_0$ is the wavelength of electromagnetic waves in the air in a frequency band which the array antenna transmits and receives, and $\varepsilon_e$ is the relative permittivity (effective relative permittivity) in an environment (medium) in which the array antenna is provided.

For example, the effective relative permittivity $\varepsilon_e$ of the microstrip line is calculated as $$\varepsilon_e = \frac{\varepsilon_r + 1}{2} + \frac{\varepsilon_r - 1}{2}\frac{1}{\sqrt{1 + 10\frac{h}{w}}} \tag{1}$$

Where the relative permittivity $\varepsilon_r$ of the substrate 50 is 4.4, the thickness h of the substrate 50 is 3.3 mm, and the width w of the feeding line 16, 26 is 3.3 mm, the effective relative permittivity Ee is calculated to be 3.2 from the formula (1). Since the wavelength $\lambda_0$ of electromagnetic waves at a frequency of 3.65 GHz, which the array antenna transmits and receives, is 82.1 mm, the effective wavelength A is 45.8 mm as determined from the above relation A.

The first array antenna 10 has at least one (one in this example) conductor 15, and the second array antenna 20 has at least one (one in this example) conductor 25 which is different from the at least one conductor 15. The conductor 15 functions as a ground for the first array antenna 10, and the conductor 25 functions as a ground for the second array antenna 20. In such a manner, the grounds for the first array antenna 10 and the second array antenna 20 are separated, and thus the first array antenna 10 and the second array antenna 20 can have different directivities on the respective grounds. Thus, for example, by making the conductors 15 and 25 have different shapes, the first array antenna 10 and the second array antenna 20 are made to have different directivities and as a result, the entire directivity of the antenna unit 101 can readily be controlled or adjusted. The conductors 15 and 25 may be the same or different from each other in shape.

Where the distance from the center of the lower radiating elements 13, 14 among the plurality of radiating elements 11 to 14 to the lower edge 15*b* of the conductor 15 in the up-and-down direction as seen in a plan view in the Y axis direction of the antenna unit 101, is H2, when the distance H2 of the first array antenna 10 in the antenna unit 101 provided to face the window glass 201 is 2.2λ or less, it is possible to realize suppression of an increase in size of the first array antenna 10 and a decrease of the gain below the first array antenna 10. As a result, it is possible to realize suppression of an increase in size of the antenna unit 101 and suppression of downward radiation of electromagnetic waves from the antenna unit 101. In order that suppression of an increase in size of the first array antenna 10 and a decrease of the gain below the first array antenna 10 are realized, the distance H2 is preferably 1.7λ or less, more preferably 1.2λ or less.

Likewise, where the distance from the center of the lower radiating elements 23, 24 among the plurality of radiating elements 21 to 24 to the lower edge 25*b* of the conductor 25 in the up-and-down direction as seen in a plan view in the Y axis direction of the antenna unit 101, is H2, by setting the distance H2 of the second array antenna 20 to be in the same manner as the distance H2 of the first array antenna 10, it is possible to realize suppression of an increase in size of the second array antenna 20 and a decrease of the gain below the second array antenna 20. As a result, it is possible to realize suppression of an increase in size of the antenna unit 101 and suppression of downward radiation of electromagnetic waves from the antenna unit 101.

Where the distance from the center of the left radiating elements 11, 13 among the plurality of radiating elements 11 to 14 to the left edge 15*c* of the conductor 15 in the left-and-right direction, as seen in a plan view in the Y axis direction of the antenna unit 101, is D1; and where the distance from the center of the right radiating elements 12, 14 among the plurality of radiating elements 11 to 14 to the right edge 15*d* of the conductor 15 in the left-and-right direction, as seen in a plan view in the Y axis direction of the antenna unit 101, is D2, when the distance D1 or the distance D2 of the first array antenna 10 in the antenna unit 101 provided to face the window glass 201 is 1.66λ or more and 1.88λ or less, the gain below the first array antenna 10 decreases. As a result, downward radiation of electromagnetic waves from the antenna unit 101 can be suppressed, and radiation of electromagnetic waves from the antenna unit 101 to a person under the antenna unit 101 can be suppressed. In order that the gain below the first array antenna 10 decreases, the distance D1 or the distance D2 is preferably 1.69λ or more and 1.85λ or less, more preferably 1.74λ or more and 1.80λ or less.

Likewise, where the distance from the center of the left radiating elements 21, 23 among the plurality of radiating elements 21 to 24 to the left edge 25*c* of the conductor 25 in the left-and-right direction, as seen in a plan view in the Y axis direction of the antenna unit 101, is D1; and where the distance from the center of the right radiating elements 22, 24 among the plurality of radiating elements 21 to 24 to the right edge 25*d* of the conductor 25 in the left-and-right direction, as seen in a plan view in the Y axis direction of the antenna unit 101, is D2, the distance D1 or the distance D2 of the second array antenna 20 in the antenna unit 101 provided to face the window glass 201 may also be set to be in the same manner as the distance D1 or the distance D2 of the first array antenna 10, whereby the gain below the second array antenna 20 decreases, and downward radiation of electromagnetic waves from the antenna unit 101 can be suppressed.

Now, the first embodiment shown in FIGS. 1 and 2 will be described in further detail below.

The antenna unit 101 is supported by a support portion 60 so as to face the window glass 201. The antenna unit 101 has a plurality of array antennas 10, 20 and the support portion 60.

In FIG. 2, radiating elements 11 to 14 and 21 to 24 (which may be hereinafter also referred to as "radiating elements 11 and the like") are antenna conductors formed to be able to transmit and receive electromagnetic waves in a desired frequency band. Examples of the desired frequency band include a UHF (Ultra High Frequency) band with a frequency of 0.3 to 3 GHz, a SHF (Super High Frequency) band with a frequency of 3 to 30 GHz, and an EHF (Extremely High Frequency) band with a frequency of 30 to 300 GHz. The radiating elements 11 and the like function as a radiating device (radiator).

The radiating elements 11 and the like are provided on a first principal surface on the exterior side of the substrate 50. The radiating elements 11 and the like may be formed by printing a metal material so that the metal material overlaps with at least a portion of a ceramic layer provided on the first principal surface of the substrate 50. Accordingly, the radiating elements 11 and the like are provided on the first principal surface of the substrate 50 so as to extend across the portion formed with the ceramic layer and a portion other than the portion formed with the ceramic layer.

For example, the radiating elements 11 and the like are conductors formed in a planar shape. The radiating elements 11 and the like are made of a conductive material such as gold, silver, copper, aluminum, chromium, lead, zinc, nickel, or platinum. The conductive material may be an alloy, for example, an alloy of copper and zinc (brass), an alloy of silver and copper, an alloy of silver and aluminum, and the like. The radiating elements 11 and the like may be a thin film. The shape of the radiating elements 11 and the like may be a rectangular or circular shape, but is not limited to these shapes.

Other materials constituting the radiating elements 11 and the like include fluorinated tin oxide (FTO), indium tin oxide (ITO), and the like.

The above-described ceramic layer can be formed on the first principal surface of the substrate 50 by printing. When the ceramic layer is provided, wires (not illustrated) attached to the radiating elements 11 and the like can be covered, which improves the aesthetics. In the present embodiment, the ceramic layer does not have to be provided on the first principal surface, and may be provided on a second principal surface on the interior side of the substrate 50. The ceramic layer is preferably provided on the first principal surface of the substrate 50 because the radiating elements 11 and the like and the ceramic layer can be formed on the substrate 50 by printing in a same step.

The material of the ceramic layer is glass frit and the like, and the thickness thereof is preferably 1 to 20 μm.

In the present embodiment, the radiating elements 11 and the like are provided on the first principal surface of the substrate 50. Alternatively, the radiating elements 11 and the like may be provided in the substrate 50. In this case, for example, the radiating elements 11 and the like can be provided as a coil form in the substrate 50.

In a case where the substrate 50 is laminated glass having a pair of glass plates and a resin layer provided between the pair of glass plates, the radiating elements 11 and the like may be provided between the glass plate and the resin layer constituting the laminated glass.

The radiating elements 11 and the like themselves may be formed in a planar plate shape. In this case, without using the substrate 50, the radiating elements 11 and the like in a planar plate shape may be directly attached to the support portion 60.

Instead of providing the radiating elements 11 and the like on the substrate 50, the radiating elements 11 and the like may be provided in a storage container. In this case, for example, the radiating elements 11 and the like in a planar plate shape may be provided in the above-described storage container. The shape of the storage container is not particularly limited, and may be a rectangular shape. The substrate 50 may be a portion of the storage container.

The radiating elements 11 and the like preferably have an optical transparency. When the radiating elements 11 and the like have an optical transparency, the aesthetics are improved, and the average solar absorptance can be reduced. The visible light transmittance of the radiating elements 11 and the like is preferably 40% or more, and is preferably 60% or more because the function as a window glass can be maintained in terms of transparency. Note that the visible light transmittance can be determined according to JIS R3106(1998).

The radiating elements 11 and the like are preferably formed in a mesh form to have optical transparency. In this case, "mesh" means a state in which through holes in a form of mesh are formed in the planar surface of the radiating elements 11 and the like.

When the radiating elements 11 and the like are formed in a mesh form, the openings of the mesh may be in a rectangular or rhomboid shape. The line width of the mesh is preferably 5 to 30 μm, more preferably 6 to 15 μm. The line spacing of the mesh is preferably 50 to 500 μm, more preferably 100 to 300 μm.

The opening rate of the radiating elements 11 and the like is preferably 80% or more, more preferably 90% or more. The opening rate of the radiating elements 11 and the like is a ratio of the area of the opening portions to the total area of the radiating elements 11 and the like including the opening portions formed in the radiating elements 11 and the like. The visible light transmittance of the radiating elements 11 and the like increases in accordance with an increase in the opening rate of the radiating elements 11 and the like.

The thickness of the radiating elements 11 and the like is preferably 400 nm or less, more preferably 300 nm or less. Although the lower limit of the thickness of the radiating elements 11 and the like is not particularly limited, the thickness of the radiating elements 11 and the like may be 2 nm or more, may be 10 nm or more, or may be 30 nm or more.

When the radiating elements 11 and the like are formed in a mesh form, the thickness of the radiating elements 11 and the like may be 2 to 40 μm. When the radiating elements 11 and the like are formed in a mesh form, the visible light transmittance can be increased, even if the radiating elements 11 and the like are thick.

The substrate 50 is, for example, a substrate provided in parallel with the window glass 201. The substrate 50 is formed, for example, in a rectangular shape as seen in a plan view, and has a first principal surface and a second principal surface. The first principal surface of the substrate 50 is provided to face the exterior side, and in the first embodiment, the first principal surface of the substrate 50 is provided to face the second glass surface on the interior side of the window glass 201. The second principal surface of the substrate 50 is provided to face the interior side, and in the first embodiment, the second principal surface of the substrate 50 is provided to face the same direction as the second glass surface on the interior side of the window glass 201.

The substrate 50 may be provided with a predetermined angle relative to the window glass 201. The antenna unit 101 may radiate electromagnetic waves in such a state that (a direction normal to) the substrate 50 on which the radiating elements 11 and the like are provided is inclined relative to (a direction normal to) the window glass 201.

The material constituting the substrate 50 is designed according to the antenna performance such as the power and directivity required for the radiating elements 11 and the like, and may, for example, be a dielectric such as glass or a resin, a metal, or a complex thereof. The substrate 50 may be constituted by a dielectric such as a resin to have an optical transparency. When the substrate 50 is constituted by a material having an optical transparency, the scenery as seen through the window glass 201 is less likely to be blocked by the substrate 50.

In a case where glass is used as the substrate 50, examples of materials of glass include soda-lime-silica glass, borosilicate glass, aluminosilicate glass, and alkali-free glass.

The glass plate used as the substrate 50 can be manufactured by a conventional manufacturing process such as float process, fusion process, redraw process, press forming process, Fourcault process, or the like. As the method for manufacturing the glass plate, it is preferable to use the float process, because it is advantageous in productivity and cost.

The glass plate is formed in a rectangular shape, as seen in a plan view. The method for cutting the glass plate may, for example, be a method for cutting the glass plate by emitting laser light onto the surface of the glass plate and moving the emission area of the laser light on the surface of the glass plate, or a mechanical cutting method with a cuter wheel or the like.

In the present embodiment, the rectangular shape includes not only a rectangle and a square but also shapes obtained by rounding the corners of a rectangle and a square. The shape of the glass plate as seen in a plan view is not limited to the rectangular shape, but may be other shapes such as a circle. The glass plate is not limited to a single plate, and may be laminated glass or insulating glass.

In a case where a resin is used for the substrate 50, the resin is preferably a transparent resin, and may be polyethylene terephthalate, polyethylene, liquid crystal polymer (LCP), polyimide (PI), polyphenylene ether (PPE), polycarbonate, acrylic resin, fluororesin, or the like. A fluororesin is preferable because it has a low dielectric constant.

Fluororesins include ethylene/tetrafluoroethylene-based copolymer (which may be hereinafter also referred to as "ETFE"), hexafluoropropylene/tetrafluoroethylene-based copolymer (which may be hereinafter also referred to as "FEP"), tetrafluoroethylene/propylene copolymer, tetrafluoroethylene/hexafluoropropylene/propylene copolymer, perfluoro(alkyl vinyl ether)/tetrafluoroethylene-based copolymer (which may be hereinafter also referred to as "PFA"), tetrafluoroethylene/hexafluoropropylene/vinylidene fluoride-based copolymer (which may be hereinafter also referred to as "THV"), polyvinylidene fluoride (which may be hereinafter also referred to as "PVDF"), vinylidene fluoride/hexafluoropropylene-based copolymer, polyvinyl fluoride, chlorotrifluoroethylene-based polymer, ethylene/chlorotrifluoroethylene-based copolymer (which may be hereinafter also referred to as "ECTFE"), polytetrafluoroethylene, and the like. Any one of the above fluororesins may be used alone, or two or more of the above fluororesins may be used in combination.

The fluororesin is preferably at least one member selected from the group consisting of ETFE, FEP, PFA, PVDF, ECTFE, and THV. ETFE is particularly preferable because ETFE has a high transparency, workability, and weather resistance.

Further, as the fluororesin, "AFLEX" (registered trademark) may be used.

The thickness h of the substrate 50 is preferably 25 μm to 10 mm. The thickness h of the substrate 50 can be designed as desired according to the location where the radiating elements 11 and the like are provided.

In a case where the substrate 50 is made of a resin, the resin is preferably formed in a film or sheet shape. The thickness h of the film or sheet is preferably 25 to 1000 μm, more preferably 100 to 800 μm, particularly preferably 100 to 500 μm, in order to achieve a high strength for holding the antenna.

In a case where the substrate 50 is glass, the thickness h of the substrate 50 is preferably 1.0 to 10 mm, in order to achieve a high strength for holding the antenna.

The arithmetic mean roughness Ra on the first principal surface on the exterior side of the substrate 50 is preferably 1.2 μm or less. This is because, when the arithmetic mean roughness Ra of the first principal surface is 1.2 μm or less, air is likely to flow in a space formed between the substrate 50 and the window glass 201. The arithmetic mean roughness Ra of the first principal surface is more preferably 0.6 μm or less, further preferably 0.3 μm or less. The lower limit of the arithmetic mean roughness Ra is not particularly limited, and, for example, 0.001 μm or more.

The arithmetic mean roughness Ra can be measured based on Japanese Industrial Standards (JIS) B0601:2001.

The area of the substrate 50 is preferably 0.01 to 4 $m^2$. When the area of the substrate 50 is 0.01 $m^2$ or more, the radiating elements 11 and the like, the conductor 15, 25, and the like can be formed without difficulty. When the area of the substrate 50 is 4 $m^2$ or less, the antenna unit is inconspicuous, such being aesthetically good. The area of the substrate 50 is more preferably 0.05 to 2 $m^2$.

The conductor 15, 25 may be provided on the second principal surface of the substrate 50 on the opposite side from the window glass 201, or may be provided on the first principal surface of the substrate 50 on the exterior side. When the conductor 15, 25 is provided on the interior side relative to the radiating elements 11 and the like, the conductor 15, 25 may be a portion that functions as an electromagnetic shielding layer capable of reducing the electromagnetic waves interference of electromagnetic waves radiated from the radiating elements 11 and the like with electromagnetic waves that occur from indoor electronic devices. The conductor 15, 25 may be constituted by a single layer, or may be constituted by multiple layers. The conductor 15, 25 may be constituted by a conventional material, and may be constituted by, for example, a metal film of copper, tungsten or the like, a transparent substrate using a transparent conductive film, or the like.

The transparent conductive film may be constituted by, for example, indium tin oxide (ITO), fluorinated tin oxide (FTO), indium zinc oxide (IZO), indium tin oxide including silicon oxide (ITSO), zinc oxide (ZnO), or a conductive material with translucency, such as a Si compound containing phosphorous (P) or boron (B).

The conductor 15, 25 is, for example, a conductor plane formed in a planar shape. The shape of the conductor 15, 25 may be a rectangular shape or a circular shape, but is not limited to these shapes.

The conductor 15, 25 is preferably formed in a mesh form so as to have an optical transparency. In this case, "mesh" means a state in which through holes in a form of mesh are formed in the planar surface of the conductor 15, 25. When the conductor 15, 25 is formed in a mesh form, the openings of the mesh may be in a rectangular or rhomboid shape. The line width of the mesh is preferably 5 to 30 μm, more preferably 6 to 15 μm. The line spacing of the mesh is preferably 50 to 500 μm, more preferably 100 to 300 μm.

The method for forming the conductor 15, 25 may be a conventional method, and may, for example, be a sputtering method or a deposition method.

The surface resistivity of the conductor 15, 25 is preferably 20 Ω/sq or less, more preferably 10 Ω/sq or less, further preferably 5 Ω/sq or less. The size of the conductor 15, 25 is preferably equal to or more than the size of the substrate 50, but may be smaller than the size of the substrate 50. When the conductor 15, 25 is provided on the second principal surface on the interior side of the substrate 50, transmission of electromagnetic waves to indoors can be suppressed. The surface resistivity of the conductor 15, 25 depends on the thickness, the material, and the opening rate of the conductor 15, 25. The opening rate is a ratio of the area of the opening portions to the total area of the conductor 15, 25 including the opening portions formed in the conductor 15, 25.

In order to improve the aesthetics, the visible light transmittance of the conductor 15, 25 is preferably 40% or more, and more preferably 60% or more. In order to suppress transmission of electromagnetic waves to indoors, the visible light transmittance of the conductor 15, 25 is preferably 90% or less, more preferably 80% or less.

The visible light transmittance increases in accordance with an increase in the opening rate of the conductor 15, 25. The opening rate of the conductor 15, 25 is preferably 80% or more, more preferably 90% or more. In order to suppress transmission of electromagnetic waves to indoors, the opening rate of the conductor 15, 25 is preferably 95% or less.

The thickness of the conductor 15, 25 is preferably 400 nm or less, more preferably 300 nm or less. The lower limit of the thickness of the conductor 15, 25 is not particularly limited, but may be 2 nm or more, 10 nm or more, or 30 nm or more.

When the conductor 15, 25 is formed in a mesh form, the thickness of the conductor 15, 25 may be 2 to 40 μm. When the conductor 15, 25 is formed in a mesh form, the visible light transmittance can be increased, even if the conductor 15, 25 is thick.

The radiating elements 11 and the like are patch elements (patch antennas) but may be other elements such as dipole elements (dipole antennas).

The support portion 60 is a portion that supports the antenna unit 101 on the window glass 201. In the present embodiment, the support portion 60 supports the antenna unit 101 so as to form a space between the window glass 201 and the radiating elements 11 and the like. The support portion 60 may be a spacer that secures a space between the window glass 201 and the substrate 50 or may be a housing of the antenna unit 101. The support portion 60 is formed by a dielectric substrate. Examples of materials of the support portion 60 include conventional resins such as silicone resin, polysulfide resin, and acrylic resin. Alternatively, a metal such as aluminum may be used.

Figure 3:
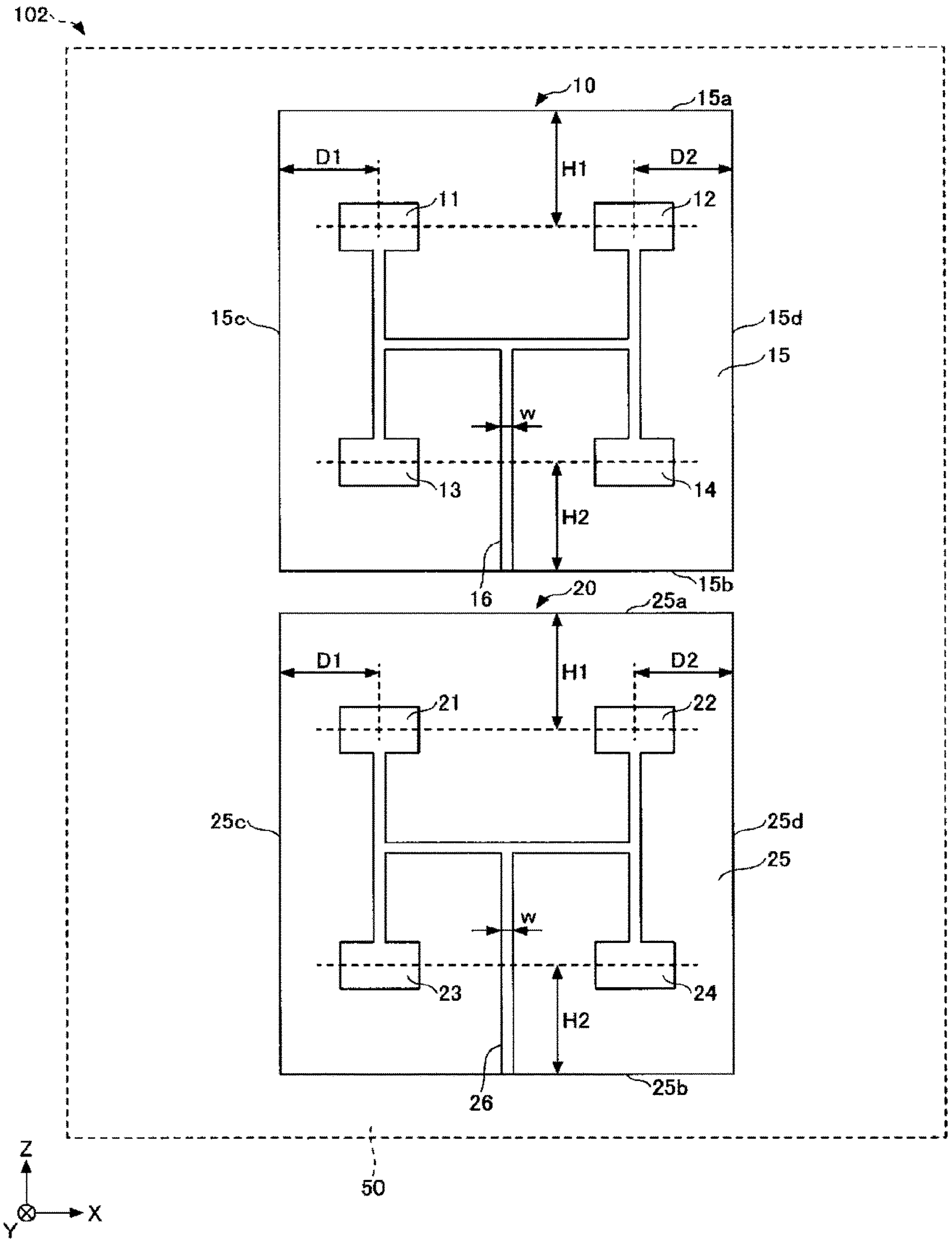
FIG. 3 is a view illustrating an example of a structure of an antenna unit according to a second embodiment as seen in a plan view.

In the Z axis direction shown in FIG. 2, the side on which the radiating elements 11,12 are disposed is defined as the upper side, and the side on which the radiating elements 13,14 are disposed is defined as the lower side. In the example shown in FIG. 2, the first array antenna 10 and the second array antenna 20 are aligned side by side in the X axis direction as seen in a plan view in the Y axis direction, by power supply polarized vertically, however, as shown in FIG. 3, they may be aligned side by side in the Z axis direction as seen in a plan view in the Y axis direction. FIG. 3 is a view illustrating an example of a structure of the antenna unit 102 according to the second embodiment, as seen in a plan view in the Y axis direction. The first array antenna 10 and the second array antenna 20 according to the second embodiment (FIG. 3) have the same constitutions as those in the first embodiment (FIG. 2), and the description is omitted by incorporating the above description by reference.

In the second embodiment also, by setting a part of or the entire distances H1, H2, D1 and D2 to be the same as the first embodiment, downward radiation of electromagnetic waves from the antenna unit 102 can be suppressed. As a result, radiation of electromagnetic waves from the antenna unit 101 to a person under the antenna unit 101 can be suppressed.

Now, results of simulation of antenna properties of the antenna unit according to the above embodiment will be described. The simulation was conducted using an electromagnetic simulator (CST Microwave Studio (registered trademark)).

Figure 4:
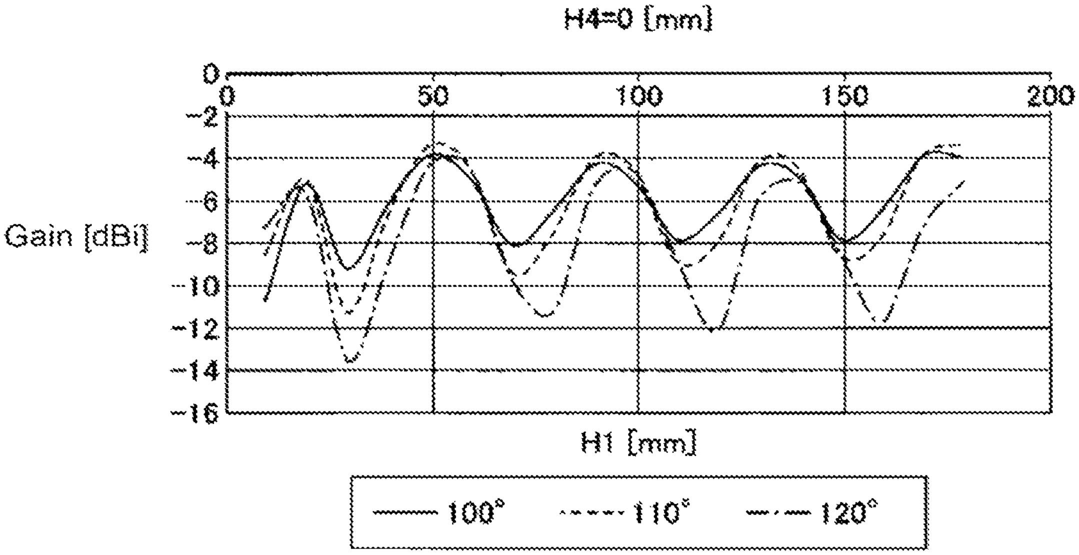
FIG. 4 illustrates an example of simulation results of the gain of co-polarization in three downward directions from the antenna unit when the distance H1 is changed while the distance H4 is fixed at 0.
Figure 6:
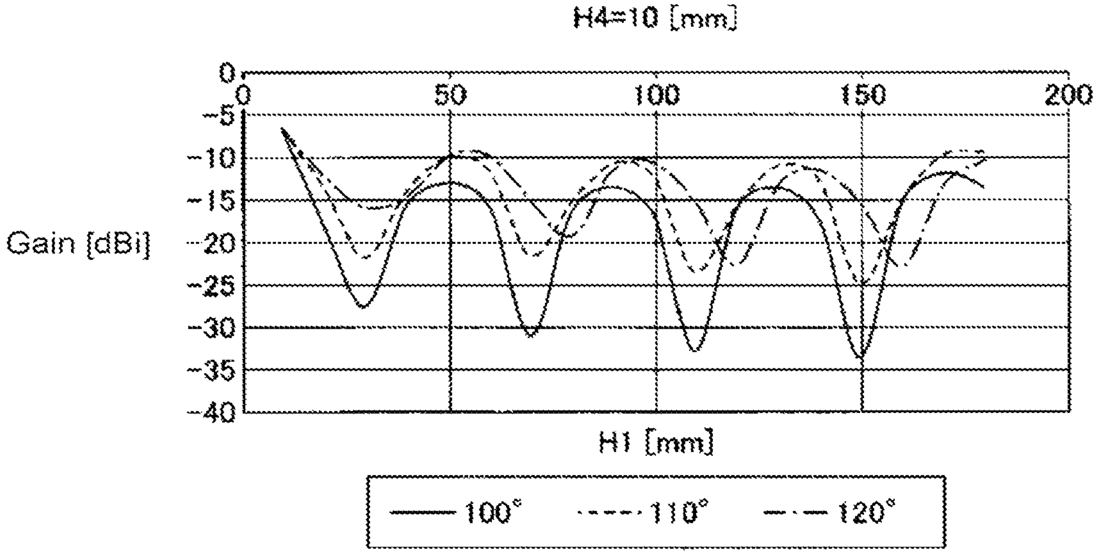
FIG. 6 illustrates an example of simulation results of the gain of co-polarization in three downward directions from the antenna unit when the distance H1 (H3) is changed while the distance H4 is fixed at 10 mm.
Figure 8:
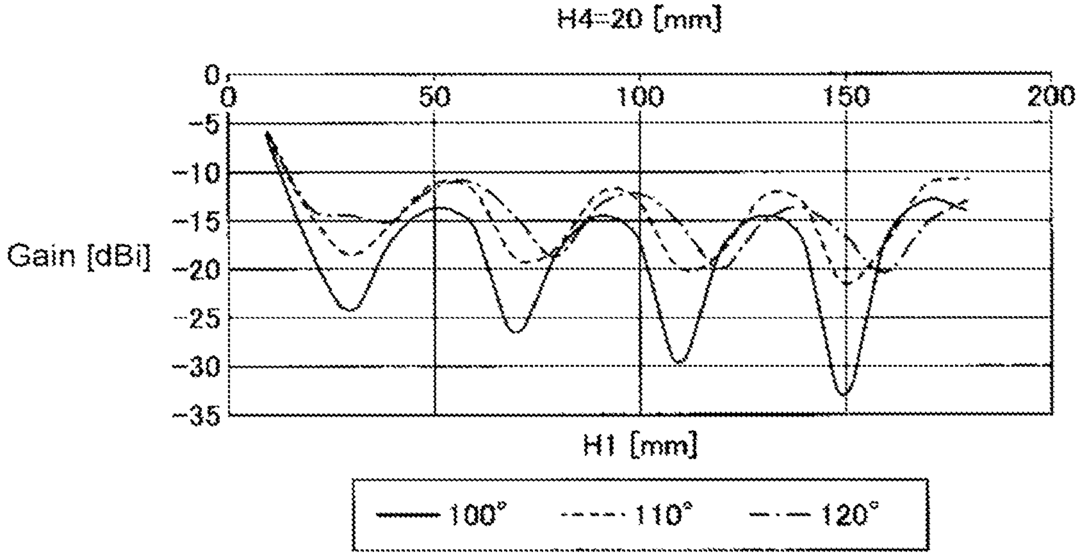
FIG. 8 illustrates an example of simulation results of the gain of co-polarization in three downward directions from the antenna unit when the distance H1 (H3) is changed while the distance H4 is fixed at 20 mm.

FIGS. 4, 6 and 8 illustrate examples of simulation results of the gain of co-polarization in three downward directions (θ: 100°, 110°, 120°) from the antenna unit, when the distance H1 (H3) was changed while the distance H4 was fixed at each value, with respect to the antenna unit according to the first embodiment. The distance H4 is a distance from the lower edge of the lower radiating elements 13, 14 among the plurality of radiating elements 11 to 14 to the lower edge 15*b* of the conductor 15 in the up-and-down direction, as seen in a plan view in the Y axis direction of the antenna unit 101.

Figure 10:
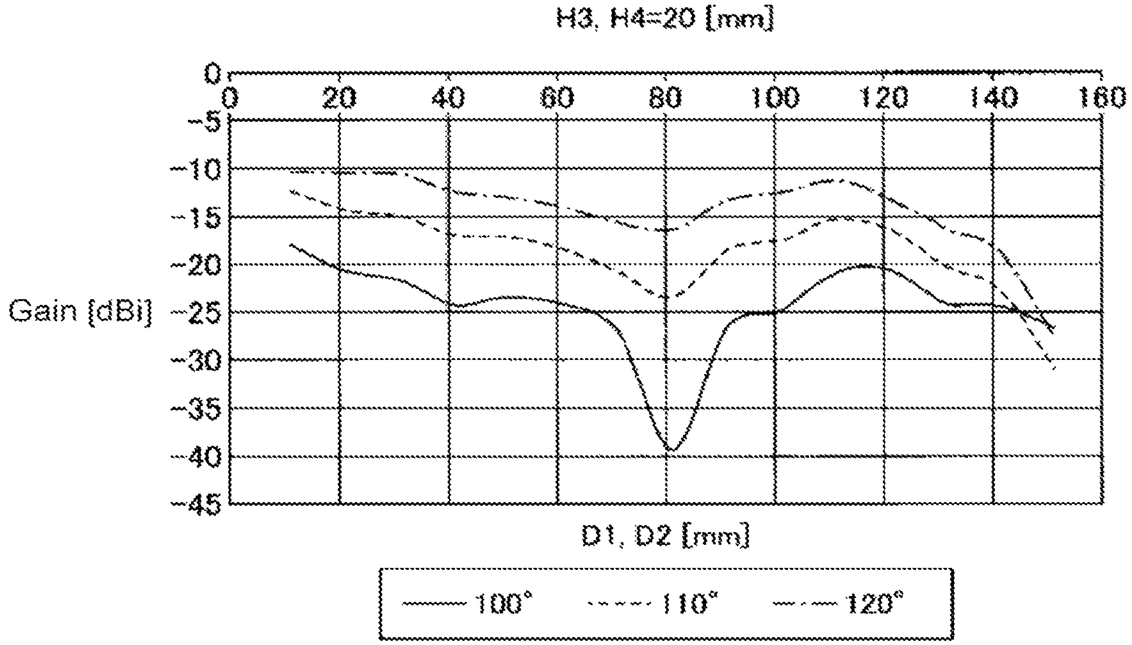
FIG. 10 illustrates an example of simulation results of the gain of co-polarization in three downward directions from the antenna unit when the distance D1, D2 is changed while the distance H3, H4 is fixed at 20 mm.
Figure 11:
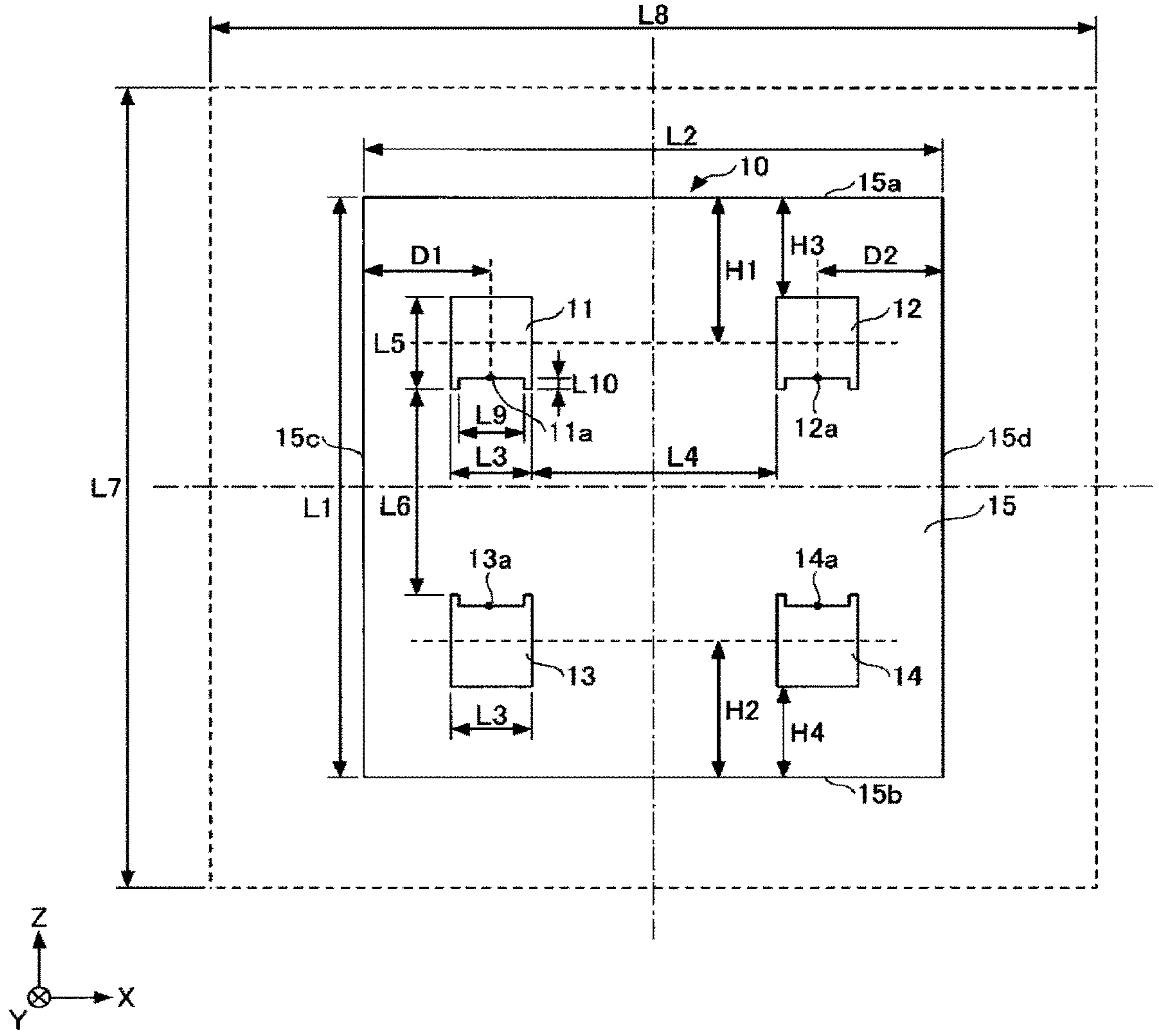
FIG. 11 is a view illustrating the antenna unit at the time of simulation as seen in a plan view.

The conditions for FIGS. 4, 6 and 8 were, for convenience of simulation, such that there was no second array antenna 20 nor feeding line 16, and the radiating elements 11 to 14 were as shown in FIG. 11. The conditions for FIGS. 4, 6 and 8 were such that the radiating elements 11 to 14 were respectively fed by gap feeding at feeding points 11*a* to 14*a* shown in FIG. 11, and phases of the radiating elements 11,12 were delayed by 60° at 3.65 GHz than phases of the radiating elements 13, 14. It is considered that the same simulation results are obtained also under conditions where the antenna unit has both the first array antenna 10 and the second array antenna 20. From the same reasons, the after-described FIGS. 5, 7, 9 and 10 illustrate data under the same conditions as above such that there was no second array antenna 20 nor feeding line 16.

At the time of simulation of FIGS. 4, 6 and 8, the simulation conditions such as dimensions of the respective members shown in FIGS. 1 and 11 were as follows.

H1, H3: variable
H2: 9.15 mm
H4: 0 mm (FIG. 4), 10 mm (FIG. 6), 20 mm (FIG. 8)
L1: 125.3 mm
L2: 204 mm
L3: 22.5 mm
L4: 55.5 mm
L5: 18.3 mm
L6: 48.7 mm
D1: 63 mm
D2: 63 mm
Thickness h of substrate 50: 3.3 mm
Relative permittivity of substrate 50: 4.4
Vertical length L7 of substrate 50: 430 mm
Horizontal length L8 of substrate 50: 430 mm
Radiating elements 11 to 14: same shape (same dimensions), symmetrically aligned
Operation frequency of first array antenna 10: 3.65 GHz
Effective wavelength λ at the operation frequency of first array antenna 10: 45.8 mm
L9: 20.5 mm
L10: 1.5 mm As shown in FIGS. 4, 6 and 8, when the distance H1 satisfied (0.5+n)λ±0.22λ, specifically when it satisfied (22.9±10) mm, (68.7±10) mm, (114.5±10) mm, and so on, the gains in the 100° direction and in the 110° direction were minimum. Thus, an antenna unit which can suppress downward radiation of electromagnetic waves from the antenna unit could be realized.

Figure 5:
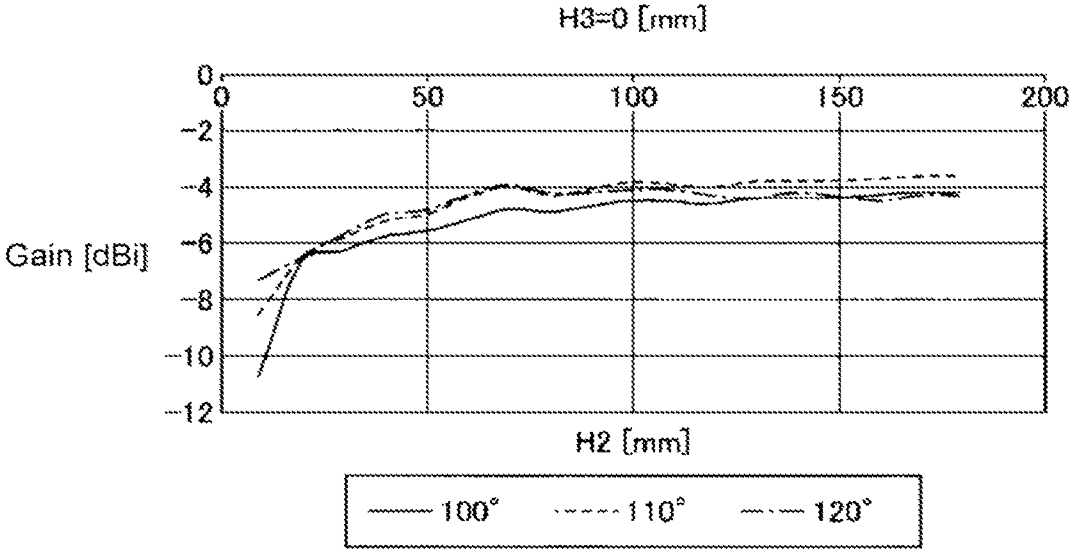
FIG. 5 illustrates an example of simulation results of the gain of co-polarization in three downward directions from the antenna unit when the distance H2 is changed while the distance H3 is fixed at 0.
Figure 7:
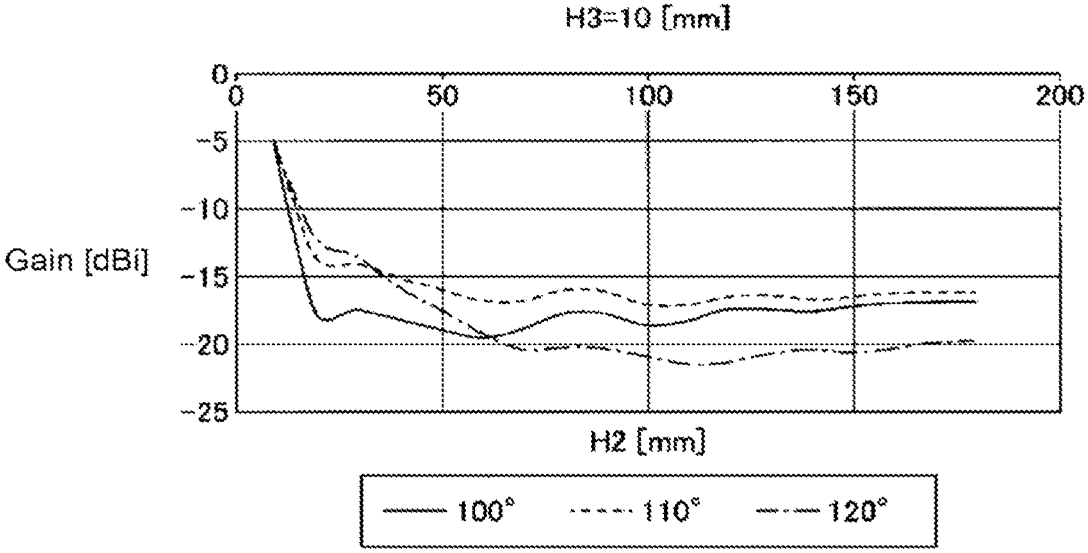
FIG. 7 illustrates an example of simulation results of the gain of co-polarization in three downward directions from the antenna unit when the distance H2 (H4) is changed while the distance H3 is fixed at 10 mm.
Figure 9:
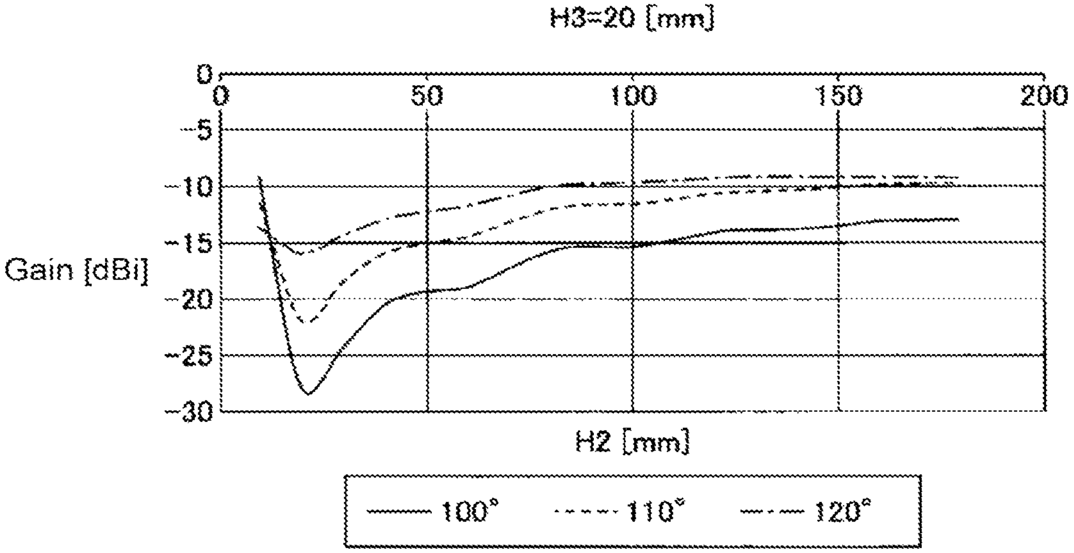
FIG. 9 illustrates an example of simulation results of the gain of co-polarization in three downward directions from the antenna unit when the distance H2 (H4) is changed while the distance H3 is fixed at 20 mm.

FIGS. 5, 7 and 9 illustrate examples of simulation results of the gain of co-polarization in three downward directions (θ: 100°, 110°, 120°) from the antenna unit, when the distance H2 (H4) was changed while the distance H3 was fixed at each value, with respect to the antenna unit according to the first embodiment. The distance H3 is a distance from the upper edge of the upper radiating elements 11, 12 among the plurality of radiating elements 11 to 14 to the upper edge 15*a* of the conductor 15 in the up-and-down direction, as seen in a plan view in the Y axis direction of the antenna unit 101.

At the time of simulation of FIGS. 5, 7 and 9, simulation conditions such as dimensions of the respective members shown in FIGS. 1 and 11 were as follows.

H2, H4: variable
H1: 9.15 mm
H3: 0 mm (FIG. 5), 10 mm (FIG. 7), 20 mm (FIG. 9)

The other conditions were the same as in FIGS. 4, 6 and 8.

As shown in FIGS. 5, 7 and 9, when the distance H2 was more than 2.2λ, specifically when it was more than 100 mm, there was substantially no change in the gain below the antenna unit. That is, when the distance H2 satisfied 2.2λ or less, it was possible to realize suppression of an increase in size of the first array antenna 10 and decrease of the gain below the first array antenna 10.

FIG. 10 illustrates examples of simulation results of the gain of co-polarization in three downward directions from the antenna unit, when the distance D1, D2 was changed while the distance H3, H4 was fixed at 20 mm, with respect to the antenna unit according to the first embodiment.

At the time of simulation of FIG. 10, the simulation conditions such as dimensions of the respective members shown in FIGS. 1 and 11, were as follows.

D1, D2: same value, variable
H1, H2: 9.15 mm
H3, H4: 20 mm The other conditions were the same as in FIGS. 5, 7 and 9.

As shown in FIG. 10, when the distance D1, D2 satisfied 1.66λ or more and 1.88λ or less, specifically, it satisfied 76 mm or more and 86.1 mm or less, the gain in the 100° direction was minimum. Accordingly, an antenna unit which can suppress downward radiation of electromagnetic waves from the antenna unit could be realized.

Figure 12:
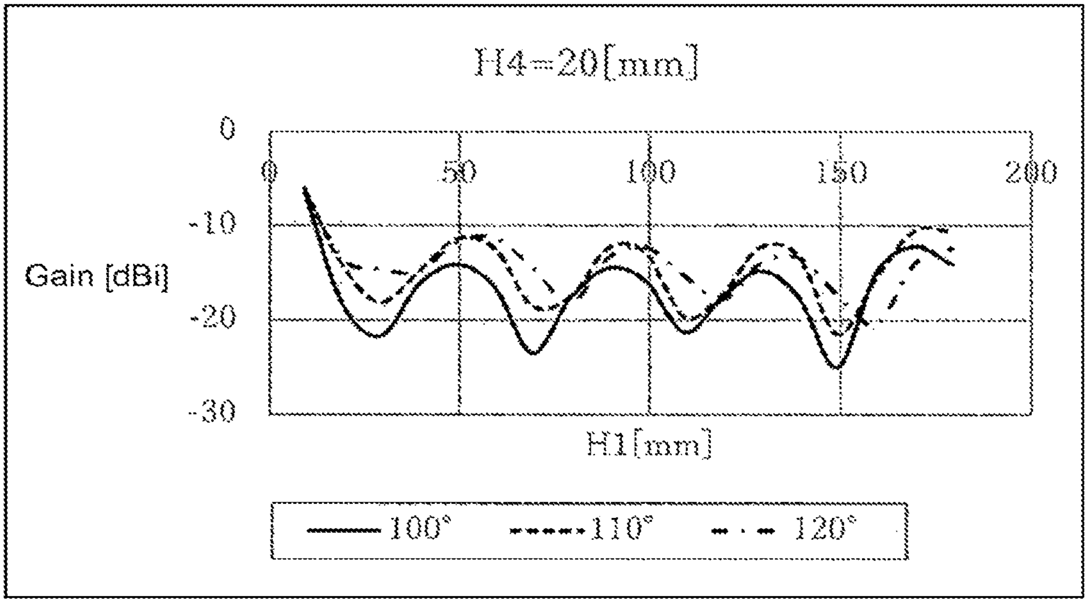
FIG. 12 illustrates an example of simulation results of the gain of co-polarization in three downward directions from the antenna unit when the distance H1 (H3) is changed while the distance H4 is fixed at 20 mm, under conditions where the antenna unit has both the first array antenna 10 and the second array antenna 20.

FIG. 12 illustrates examples of simulation results of the gain of co-polarization in three downward directions (θ: 100°, 110°, 120°) from the antenna unit when the distance H1 (H3) was changed while the distance H4 was fixed at 20 mm, under conditions where the antenna unit according to the first embodiment had both the first array antenna 10 and the second array antenna 20. The distance H4 is a distance from the lower edge of the lower radiating elements 13, 14 among the plurality of radiating elements 11 to 14 to the lower edge 15*b* of the conductor 15 in the up-and-down direction, as seen in a plan view in the Y axis direction of the antenna unit 101.

Figure 15:
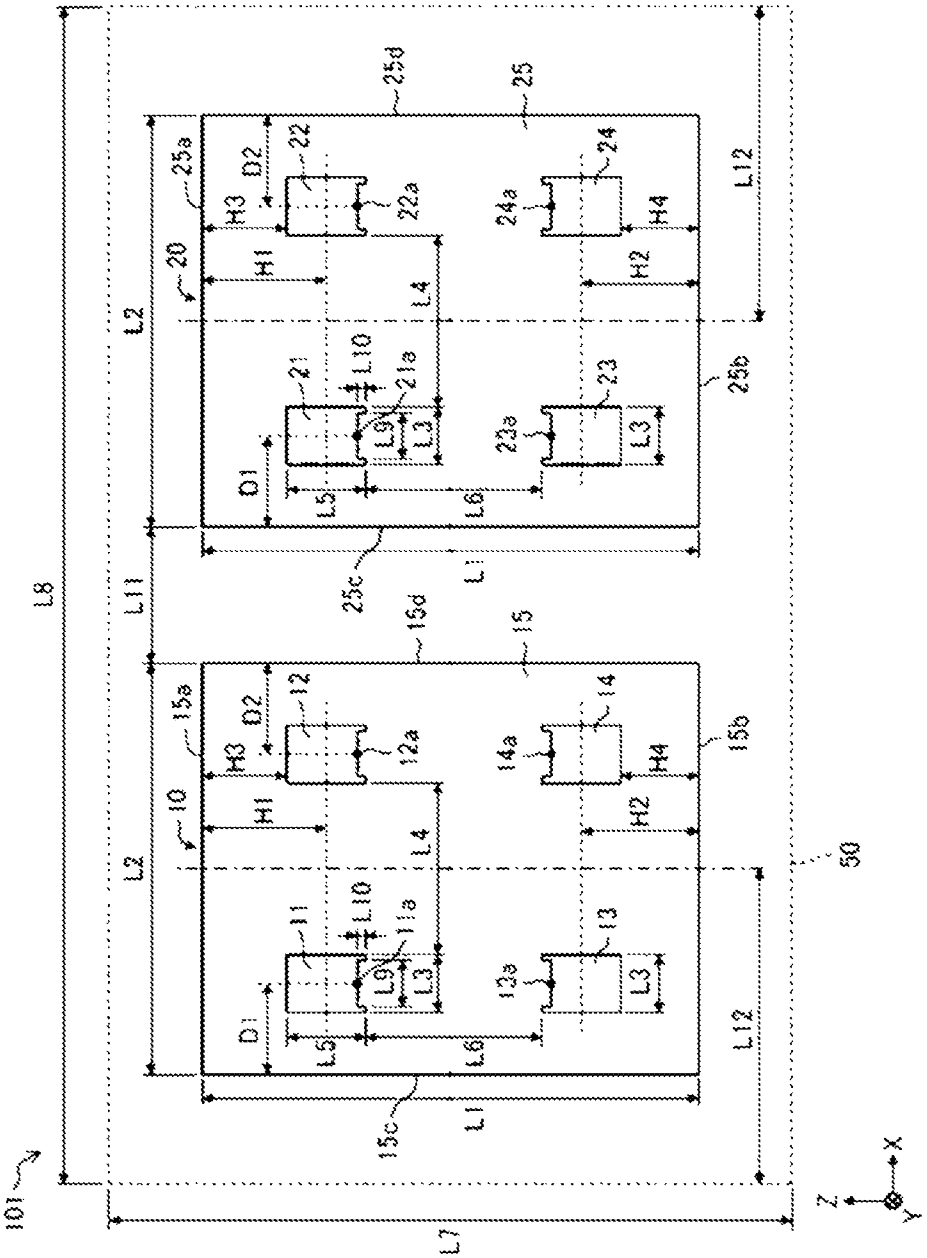
FIG. 15 is a view illustrating an example of the structure of the antenna unit at the time of simulation as seen in a plan view.

The conditions for FIG. 12 were, for convenience of simulation, such that there was no feeding line 16, and the radiating elements 11 to 14 and 21 to 24 were as shown in FIG. 15. The conditions for FIG. 12 were such that the radiating elements 11 to 14 and 21 to 24 were respectively fed by gap feeding at feeding points 11*a* to 14*a* and 21*a* to 24*a* as shown in FIG. 15, and phases of the radiating elements 11,12, 21,22 were delayed by 60° at 3.65 GHz than phases of the radiating elements 13, 14, 23, 24.

At the time of simulation of FIG. 12, simulation conditions such as dimensions of the respective members shown in FIGS. 1 and 15 were as follows.

H1, H3: variable
H2: 9.15 mm
H4: 20 mm
L1: 125.3 mm
L2: 204 mm
L3: 22.5 mm L4: 55.5 mm
L5: 18.3 mm
L6: 48.7 mm
D1: 63 mm
D2: 63 mm
Thickness h of substrate 50: 3.3 mm
Relative permittivity of substrate 50: 4.4
Vertical length L7 of substrate 50: 430 mm
Horizontal length L8 of substrate 50: 860 mm
Radiating elements 11 to 14, 21 to 24: same shape (same dimensions), symmetrically aligned
Operation frequency of first array antenna 10, second array antenna: 3.65 GHz
Effective wavelength λ at operation frequency of first array antenna 10, second array antenna: 45.8 mm
L9: 20.5 mm
L10: 1.5 mm
L11: 226 mm
L12: 215 mm As shown in FIG. 12, when the distance H1 satisfied (0.5+n)λ±0.22λ, specifically it satisfied (22.9±10) mm, (68.7±10) mm, (114.5±10) mm, and so on, the gains in the 100° direction and in the 110° direction were minimum, and the same results as in FIG. 8 were obtained. Thus, an antenna unit which can suppress downward radiation of electromagnetic waves from the antenna unit could be realized.

Figure 13:
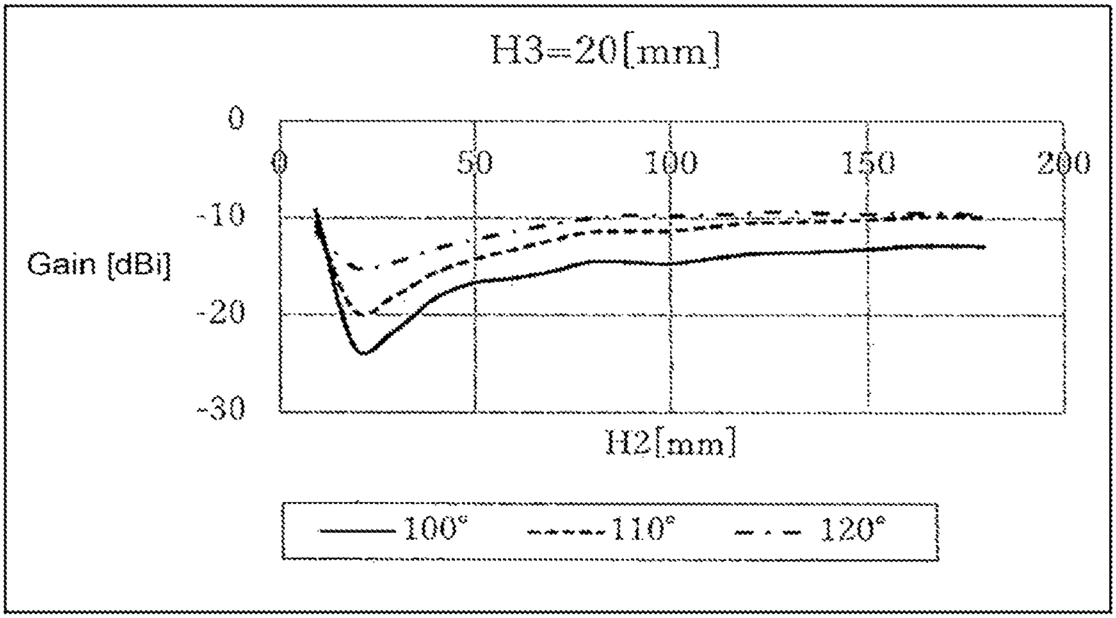
FIG. 13 illustrates an example of simulation results of the gain of co-polarization in three downward directions from the antenna unit when the distance H2 (H4) is changed while the distance H3 is fixed at 20 mm, under conditions where the antenna unit has both the first array antenna 10 and the second array antenna 20.

FIG. 13 illustrates examples of simulation results of the gain of co-polarization in three downward directions (θ: 100°, 110°, 120°) from the antenna unit when the distance H2 (H4) was changed while the distance H3 was fixed at 20 mm, under conditions where the antenna unit according to the first embodiment had both the first array antenna 10 and the second array antenna 20. The distance H3 is a distance from the upper edge of the upper radiating elements 11 and 12 among the plurality of radiating elements 11 to 14 to the upper edge 15*a* of the conductor 15 in the up-and-down direction, as seen in a plan view in the Y axis direction of the antenna unit 101.

At the time of simulation of FIG. 13, simulation conditions such as dimensions of the respective members shown in FIGS. 1 and 15 were as follows.

H2, H4: variable
H1: 9.15 mm
H3: 20 mm

The other conditions were the same as in FIG. 12.

As shown in FIG. 13, when the distance H2 was more than 2.2λ, specifically, it was more than 100 mm, there was substantially no change in the gain below the antenna unit, and the same results as in FIG. 9 were obtained. That is, when the distance H2 satisfied 2.2λ or less, it was possible to realize suppression of an increase in size of the first array antenna 10 and a decrease of the gain below the first array antenna 10.

Figure 14:
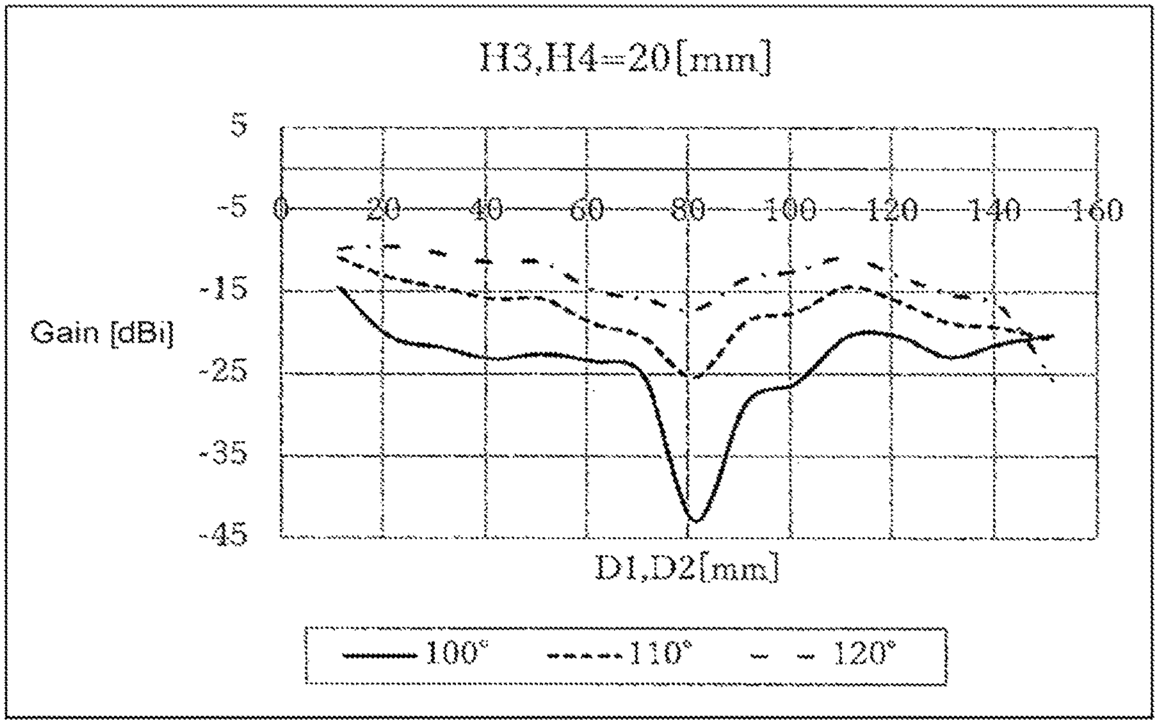
FIG. 14 illustrates an example of simulation results of the gain of co-polarization in three downward directions from the antenna unit when the distance D1, D2 is changed while the distance H3, H4 is fixed at 20 mm, under conditions where the antenna unit has both the first array antenna 10 and the second array antenna 20.

FIG. 14 illustrates examples of simulation results of the gain of co-polarization in three downward directions from the antenna unit when the distance D1, D2 was changed while the distance H3, H4 was fixed at 20 mm, under conditions where the antenna unit according to the first embodiment had both the first array antenna 10 and the second array antenna 20.

At the time of simulation of FIG. 14, simulation conditions such as dimensions of the respective members shown in FIGS. 1 and 15 were as follows.

D1, D2: same value, variable
H1, H2: 9.15 mm
H3, H4: 20 mm

The other conditions were the same as in FIG. 13.

As shown in FIG. 14, when the distance D1, D2 satisfied 1.66λ or more and 1.88λ or less, specifically it satisfied 76 mm or more and 86.1 mm or less, the gain in the 100° direction was minimum, and the same results as in FIG. 10 were obtained. Thus, an antenna unit which can suppress radiation of electromagnetic waves below the antenna unit could be realized.

Although the antenna unit and the window glass have been described above with reference to the embodiments, the present invention is not limited to the above-described embodiments. Various modifications and improvements such as combinations and replacements with some or all of other embodiments can be made within the subject matters of the present invention.

For example, the antenna unit does not have to be fixed to the window glass. The antenna unit may be hung from the ceiling so that the antenna unit is installed and used so as to face the window glass, or the antenna unit may be fixed to a protrusion (for example, a window frame, a window sash, or the like for holding the outer edge of the window glass) that is present around the window glass. The antenna unit may be installed so as to be in contact with the window glass, or may be installed in proximity thereto without being in contact with the window glass.

The conductor 15, 25 shown in FIG. 1 and FIG. 2 may be provided on the first principal surface on the window glass 201 side of the substrate 50 when electromagnetic waves are to be radiated into the interior side. In such a case, the conductor 15, 25 is provided on the exterior side relative to the radiating elements 11 and the like. By providing the conductors 15 and 25 on the first principal surface side, on the exterior side of the substrate 50, transmission of electromagnetic waves to the outdoors can be suppressed.

This application is a continuation of PCT Application No. PCT/JP2021/019428, filed on May 21, 2021, which is based upon and claims the benefit of priority from Japanese Patent Application No. 2020-094781 filed on May 29, 2020. The contents of those applications are incorporated herein by reference in their entireties.

REFERENCE SYMBOLS

10: first array antenna
11, 12, 13, 14: radiating element
11*a*, 12*a*, 13*a*, 14*a*: feeding point
15: conductor
16: feeding line
17: microstrip line
20: second array antenna
21, 22, 23, 24 radiating element
25: conductor
26: feeding line
27: microstrip line
50: substrate
60: support portion
101, 102: antenna unit
201: window glass
301: antenna unit-attached window glass

What is claimed is:

1. An antenna unit, comprising:

a plurality of array antennas, wherein each of the plurality of array antennas has a plurality of radiating elements and at least one conductor situated on an interior side or on an exterior side relative to the plurality of radiating elements, and the effective wavelength of the plurality of array antennas at the operation frequency is λ, and an integer of 0 or more is n, the distance from the center of the upper radiating element among the plurality of radiating elements to the upper edge of the conductor in the up-and-down direction is $(0.5+n)\lambda \pm 0.22\lambda$, as seen in a plan view of the antenna unit.

2. The antenna unit according to claim 1, wherein the conductor is situated on an interior side relative to the plurality of radiating elements.

3. The antenna unit according to claim 1, wherein the distance from the center of the lower radiating element among the plurality of radiating elements to the lower edge of the conductor in the up-and-down direction, is $2.2\lambda$ or less, as seen in the plan view.

4. The antenna unit according to claim 3, wherein the distance from the center of the left radiating element among the plurality of radiating elements to the left edge of the conductor in the left-and-right direction, or the distance from the center of the right radiating element among the plurality of radiating elements to the right edge of the conductor in the left-and-right direction, is $1.66\lambda$ or more and $1.88\lambda$ or less, as seen in the plan view.

5. The antenna unit according to claim 1, further comprising, between the plurality of radiating elements and the conductor, a substrate containing a dielectric.

6. The antenna unit according to claim 5, wherein the dielectric is glass.

7. The antenna unit according to claim 5, wherein the dielectric is one selected from the group consisting of polycarbonate, an acrylic resin, polyethylene terephthalate, polyethylene and polyimide.

8. The antenna unit according to claim 1, wherein the radiating elements are patch elements.

9. The antenna unit according to claim 1, wherein the radiating elements are formed in a mesh form.

10. The antenna unit according to claim 1, wherein the conductor is formed in a mesh form.

11. The antenna unit according to claim 1, wherein each of the plurality of array antennas has a microstrip line.

12. A window glass comprising the antenna unit as defined in claim 1.

* * * * *